United States Patent [19]

Joyce et al.

[11] 3,748,829

[45] July 31, 1973

[54] ADSORBING EVAPORATIVE EMISSION DURING FUELING OF AUTOMOTIVE VEHICLES

[75] Inventors: Ronald Stone Joyce, Pittsburgh, George Robert Stoneburner, Coraopolis, both of Pa.

[73] Assignee: Calgon Corporation, Pittsburgh, Pa.

[22] Filed: July 2, 1970

[21] Appl. No.: 51,964

[52] U.S. Cl............................ 55/74, 55/387, 141/59, 220/86 R
[51] Int. Cl........................................... B01d 53/14
[58] Field of Search.................... 210/446, 448, 449; 55/316, 387, 389, DIG. 30, 74; 220/86 R, 85 F; 123/136; 141/59

[56] References Cited

UNITED STATES PATENTS

| 2,154,072 | 4/1939 | Kamrath | 220/86 X |
| 2,675,093 | 4/1954 | McCall et al. | 55/387 X |
| 3,289,711 | 12/1966 | Hall | 220/86 X |
| 3,581,782 | 6/1971 | Onufer | 141/59 |

*Primary Examiner*—Robert L. Lindsay, Jr.
*Attorney*—William L. Kreyer and Herbert J. Zeh, Jr.

[57] ABSTRACT

Fuel vapors which are normally lost in fueling automotive vehicles and from fuel storage tanks are adsorbed on an adsorbent, preferably activated carbon, and are subsequently recovered therefrom.

2 Claims, 6 Drawing Figures

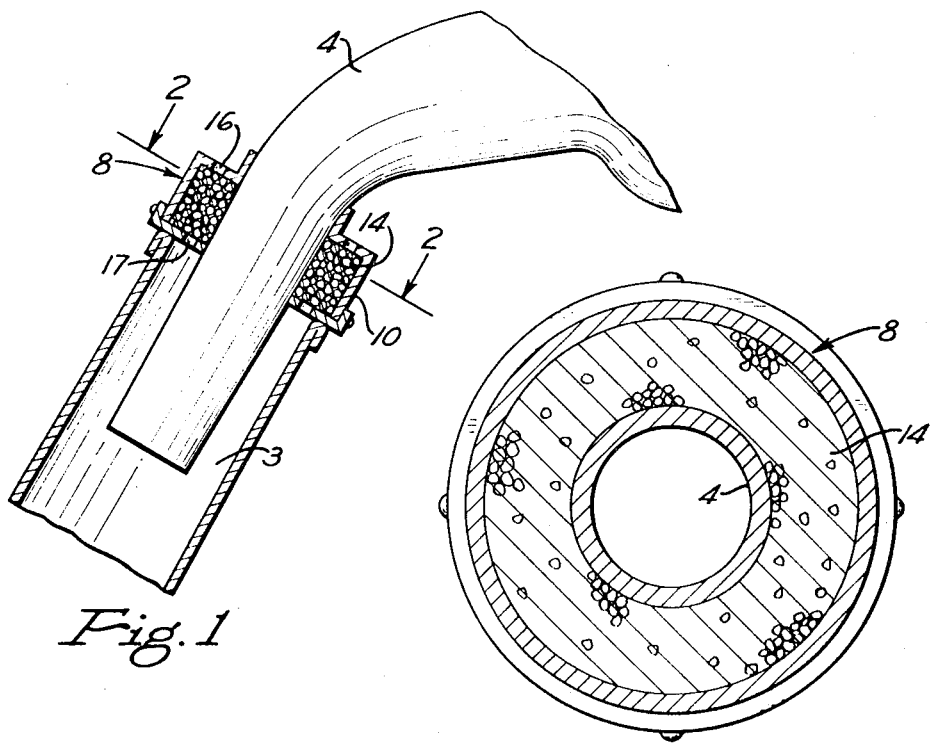
Fig. 1
Fig. 2
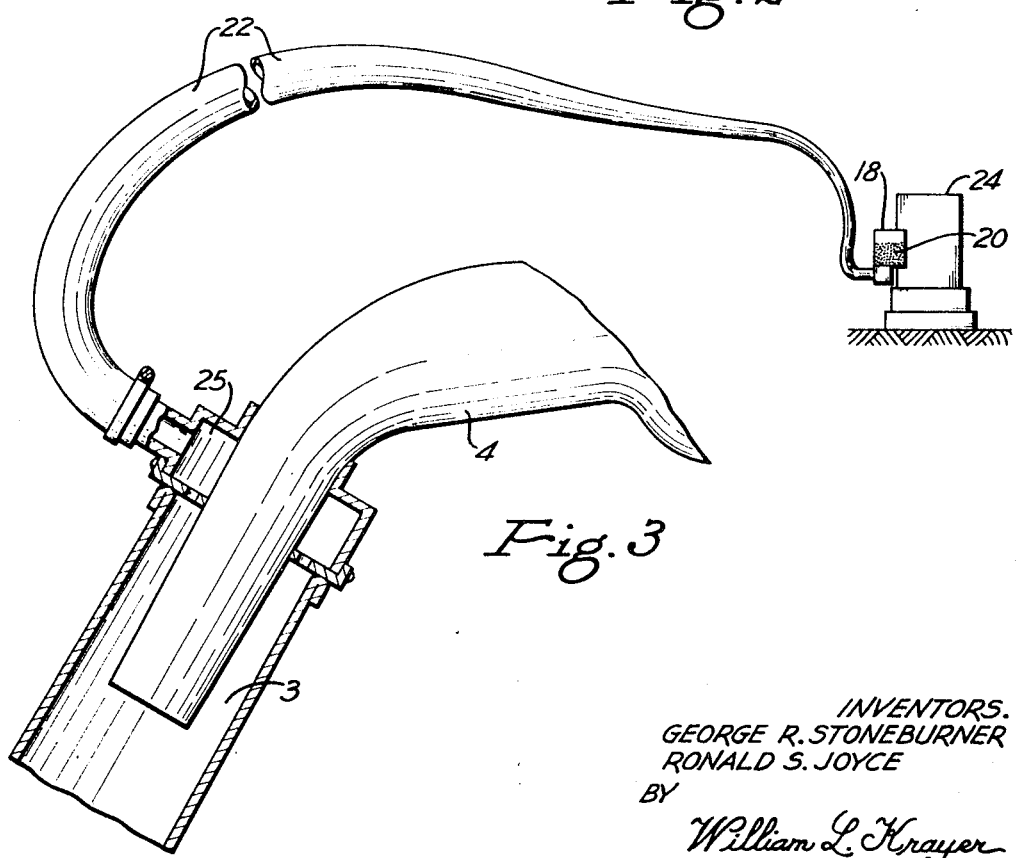
Fig. 3
INVENTORS.
GEORGE R. STONEBURNER
RONALD S. JOYCE
BY
William L. Krayer
ATTORNEY.

INVENTORS.
GEORGE R. STONEBURNER
RONALD S. JOYCE
BY
William L. Krayer
ATTORNEY.

ADSORBING EVAPORATIVE EMISSION DURING FUELING OF AUTOMOTIVE VEHICLES

BACKGROUND OF THE INVENTION

The present invention relates to the adsorption and recovery of fuel vapors.

The problem of evaporative loss of volatile fuel for automotive vehicles is one of growing significance to the petroleum and automotive industries. The smog and pollution problem created by such evaporative losses is at least as important as the economic loss of valuable gasoline or the like.

No satisfactory method has been found or adopted to control the loss of fuel by evaporation during fueling of automobiles, from normal "breathing" in filling station storage tanks, or by transferring gasoline either from tank trucks to filling stations or from the refineries to tank trucks.

Assuming a distillation range for a typical gasoline stated as follows:

| Percent Evaporated | °F |
|---|---|
| Initial Boiling Point | 90 |
| 10 | 125 |
| 50 | 215 |
| 90 | 335 |
| End Point | 415 | the amount of evaporative loss on a hot summer day during transfer of gasoline from a filling station pump to an automobile may be estimated at 0.25 percent. Even on a cold day, i.e., 32°F., evaporative loss could amount to a significant percent, depending on the turbulence and exposure to an outlet which is permitted.

Such evaporation represents a pollution and health problem, and a dangerous, combustible or explosive atmosphere which is all too common, particularly in urban areas.

SUMMARY OF THE INVENTION

We have invented a device and system for the control of evaporative emissions from hydrocarbon fuels, particularly gasoline.

Our invention includes the use of an adsorbent device to adsorb fuel vapors in combination with the nozzle or other means for delivering fuel to a tank such as an underground storage tank or an automobile tank. In a preferred embodiment, the device is disposed in such a way on the delivery means that escaping vapors must pass through the adsorbent. The preferred adsorbents are activated carbons but there can be employed other hydrocarbon vapor adsorbents, such as molecular sieves. As typical of the activated carbon adsorbents suitable for the invention mention is made of Pittsburgh Activated Carbon-type "BPX" activated carbon (8 × 20 United States Sieve Series) and Pittsburgh Activated Carbon-type "BPL" (12 × 30 United States Sieve Series).

The invention will be understood best in connection with the drawings wherein:

FIG. 1 is a broken away view partially in section of one embodiment of the invention;

FIG. 2 is a sectional view along the line 2—2 of FIG. 1;

FIG. 3 is a broken away view partially in section of another embodiment of the invention;

Figure 4:
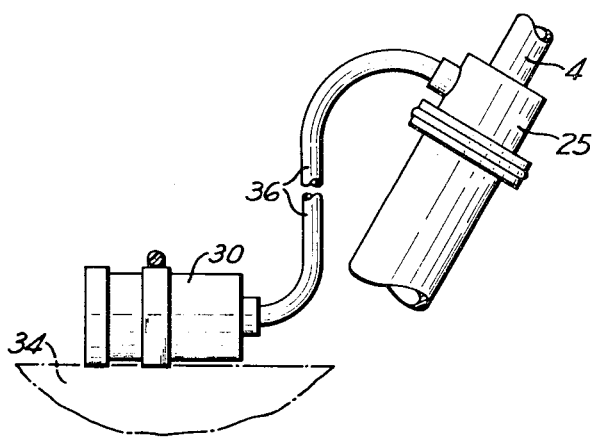
FIG. 4 is a view partially broken away of an alternative embodiment.

Referring more specifically to FIGS. 1 and 2 of the invention, when it is desired to refuel an automobile with gasoline, there is inserted into the upper end of the automobile's fuel tank (3) a gasoline pump hose nozzle (4). A generally cylindrical canister (8) having outer wall (10) surrounds nozzle (4). The canister is filled with activated carbon particles (14) and is in tight engagement with the circular end of fuel tank (3) so that as vapors leave the fuel tank (3) they are forced to go through the activated carbon particles in the canister (8) by way of inlet ports (17). The activated carbon adsorbs any gasoline vapors which come out of the gasoline tank during the filling operation while permitting the air which is being displaced from the fuel tank during the filling to pass out into the atmosphere through ports (16), located on the top of the canister (8).

In the modification shown in FIG. 3 there is attached to the pump (24) a canister (18) filled with activated carbon particles (20). An auxiliary hose (22) connects the canister (18) with a sealed chamber (25) surrounding the gasoline filling hose (4). Gasoline vapors from the tank (3) pass directly into chamber (25). As a result, all of the gasoline vapors pass via hose (22) to canister (18) where they are adsorbed by the activated carbon while the air being displaced from the gasoline tank passes through the canister into the atmosphere.

Canister (18) can be of considerably larger capacity than canister (8) since it need not be attached to the movable hose.

Whenever the canisters (8) and (18) have reached a desired level of adsorption they can be removed and regenerated by heating, preferably with steam distillation, to recover the gasoline volatiles.

As shown in FIG. 4 the canister (30) containing activated carbon can be mounted on the frame (34) of the automobile. The auxiliary hose (36) which is permanently attached to sealed chamber (25) connects the canister (30) with the chamber (25) surrounding the gasoline filling hose (4) while the automobile is receiving gasoline.

Figure 5:
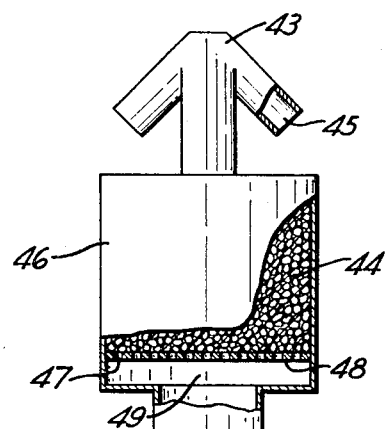
FIG. 5 is a partial sectional view of still another form of the invention.

In FIG. 5, a scheme is shown to minimize the loss of vapors and evaporative emissions from filling station storage tanks, both by normal breathing and during filling. Gasoline storage tank (40) is located underground and is fitted with a breather pipe (42) extending at least to the ground surface. As shown, the breather pipe (42) normally projects to a considerable height. At its top, it is fitted with canister (46) having a cover (43) which has holes (45) in its side for escaping air and unadsorbed vapors. The canister (46) has a bottom support (48) defining a chamber for holding activated carbon (44) and a chamber (49) for distributing the vapors and gas over the entire bottom surface of the upper chamber. Bottom support (48) contains holes (47) which permit the entrance of vapors and gas while holding the carbon in place.

Figure 6:
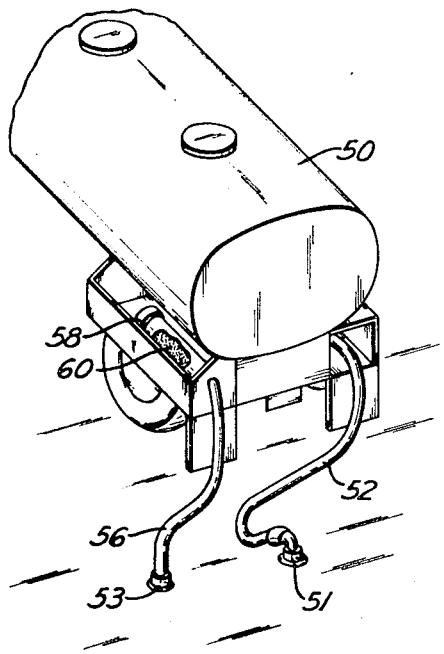
FIG. 6 is a perspective view of an alternative form of the invention.

As shown in FIG. 6, during filling of the storage tank (not shown) through supply inlet (51) from gasoline delivery truck (50) the gasoline is delivered via hose (52). As the underground storage tank fills, the air and gasoline vapors which are replaced pass through a separate outlet (53) and hose (56) to canister (58) on the truck. The canister is filled with activated carbon (60) and is open to the atmosphere or is exited to the truck tank (50). There is no air pollution since the gasoline vapors are adsorbed by the activated carbon. When the carbon is exhausted, it can be regenerated and the adsorbed gasoline recovered. The canister with spent carbon can then be returned to the refinery to recover the adsorbed carbon, e.g., by steam distillation. Alternatively, the spent carbon can be reactivated by attaching it to the fuel vapor recovery system of the gasoline delivery truck and permitting air to sweep the adsorbed gasoline out of the canister and into the delivery truck's engine manifold.

Although it is normally uneconomical to attempt to recover and use the volatiles from a single canister such as shown in FIG. 1, the system is quite useful for pollution control even if the saturated carbon is discarded. However, a number of such canisters, or the carbon therein can be regenerated and the vapors economically reclaimed by an air purge, or simply regenerated by a steam purge.

We claim:

1. Method of preventing the escape of gasoline vapor into the atmosphere during the transfer of gasoline from a storage container through a gasoline pump hose into an automotive fuel tank comprising placing a cylindrical canister having openings in each end thereof and filled with a gasoline vapor adsorbent material around the hose nozzle and in tight engagement therewith and in tight engagement with the opening of the automotive fuel tank so that the vapors leaving the fuel tank are forced through the canister.

2. Method as in claim 1 wherein the gasoline vapor adsorbent material is activated carbon.

* * * * *